S. D. WHITE.
COMBINED WHIP-SOCKET AND REIN-HOLDER.
No. 184,193. Patented Nov. 7, 1876.
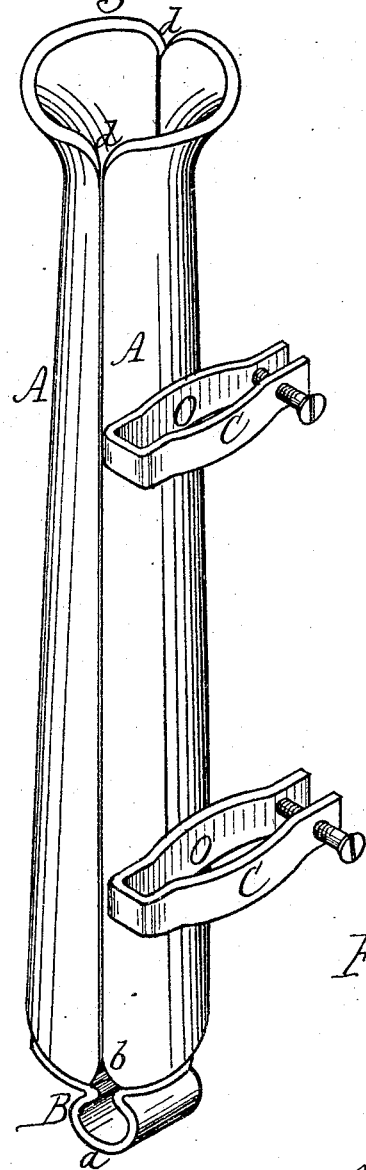
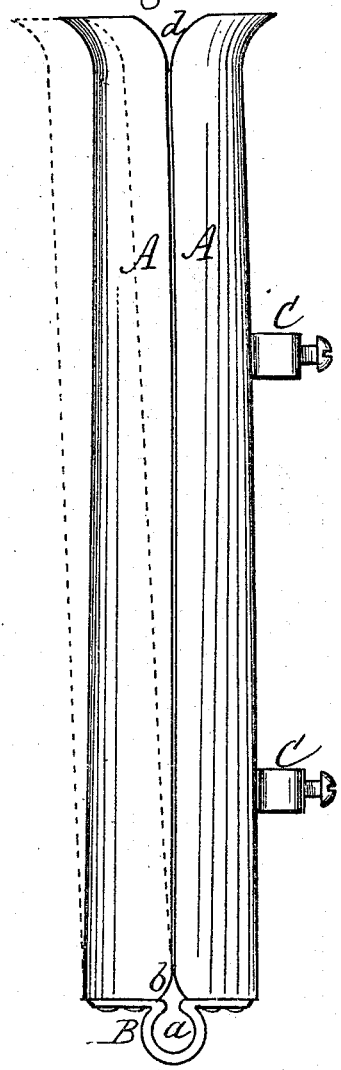
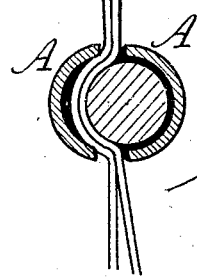
Witnesses.
E. B. Scott
Lom. J. McPherson
Inventor.
Sanford D. White
pr R. F. Osgood,
Atty.

UNITED STATES PATENT OFFICE.

SANFORD D. WHITE, OF MEDINA, NEW YORK.

IMPROVEMENT IN COMBINED WHIP-SOCKET AND REIN-HOLDER.

Specification forming part of Letters Patent No. 184,193, dated November 7, 1876; application filed April 24, 1876.

*To all whom it may concern:*

Be it known that I, SANFORD D. WHITE, of Medina, in the county of Orleans and State of New York, have invented a certain new and useful Improvement in Combined Whip-Sockets and Rein-Holders; and I do hereby declare that the following is a full, clear, and exact description of the construction and operation of the same, reference being had to the accompanying drawings, in which—

Figure 1 is a perspective view. Fig. 2 is an elevation. Fig. 3 is a cross-section, showing the whip and the reins in the socket.

My improvement relates to combined whip-sockets and rein-holders. These are usually made with a socket for holding the whip, and an exterior attachment for holding the reins.

My invention consists of a socket of usual form, made in halves, and connected at the bottom by a spring, which serves the double purpose of a spring and hinge, as hereinafter more fully described.

A A represent the two halves of the socket, which are of usual form and made of malleable iron. These are divided clear to the bottom, and are connected at that point by a stiff spring, B, which is riveted to each part by double rivets, as shown. This spring is preferably formed with a central coil or bend, *a*, by which greater elasticity and a larger opening of the socket is produced. If desired, the ends of the springs may be carried around the ends of the socket, and lapped over the sides, to produce greater strength. This spring answers the double purpose of a spring and a hinge, allowing the parts of the socket to open wide, and yet making them self-closing without any other attachment. *b* is an opening at the bottom of the socket, to allow water to pass through. C C are clamps by which the socket is attached to the dash-board. The top of the socket is made bell-mouthed, and with notches *d d*, to direct the reins in place.

The whip is placed in the socket in the ordinary way. The reins are inserted—either double or single—by simply pressing them down in the notches *d d*, between the half-sockets. This can be done either with the whip in or out of the socket, as the jaws yield sufficiently for the purpose. When the whip is in place, as shown in Fig. 3, the reins will bend around the whip by the pressure of the jaws, so that there is less danger of drawing the reins through.

The distinguishing feature of the invention is the construction of the device in two half-sockets, open clear to the bottom, and united at that point by a spring, the device thus serving the double purpose of a whip-socket and a rein-holder, without the use of any extra attachment, and the socket being of the ordinary form.

I am aware that a socket has been made in halves, pivoted half-way up; but such serves only as a whip-socket, and not as a rein-holder. To make it open sufficiently wide to form a rein-holder the halves would have to be set so far apart as to render it impracticable in use as a whip-socket. My device serves both purposes, and yet is close-fitting to the whip when in place.

I am also aware that a socket is known having a hinge at the bottom and a spring near the top; but it is adapted only to holding a whip, and not the reins.

What I claim as new is—

The combination, with the half-sockets A A, divided from top to bottom, of the spring B, attached to the opposite sides at the bottom, and serving the double purpose of a spring to close the socket, and a hinge to allow it to open, as and for the purpose specified.

In witness whereof I have hereunto signed my name in the presence of two subscribing witnesses.

SANFORD D. WHITE.

Witnesses:
D. W. COLE,
G. W. PRATT.